Oct. 6, 1953     W. H. HARSTICK     2,654,500
CAN SUBMERGING DEVICE FOR MILK COOLERS
Filed Oct. 15, 1949
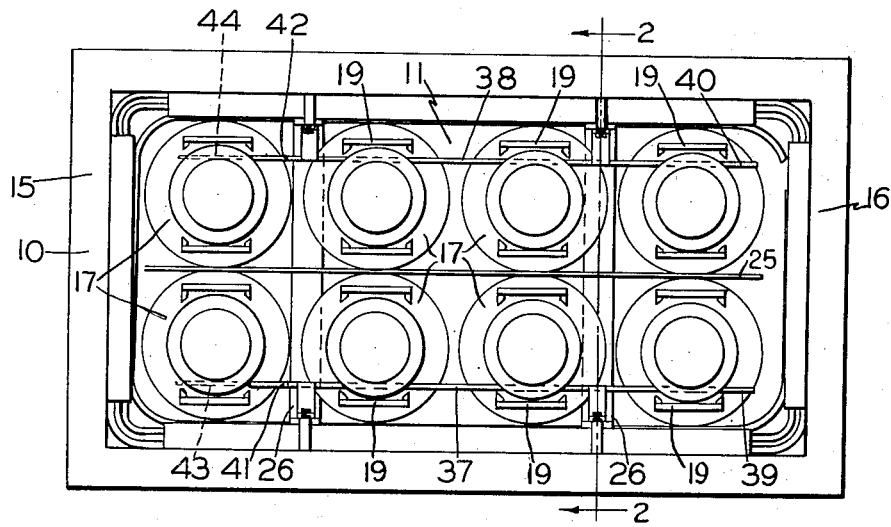
FIG. 1.
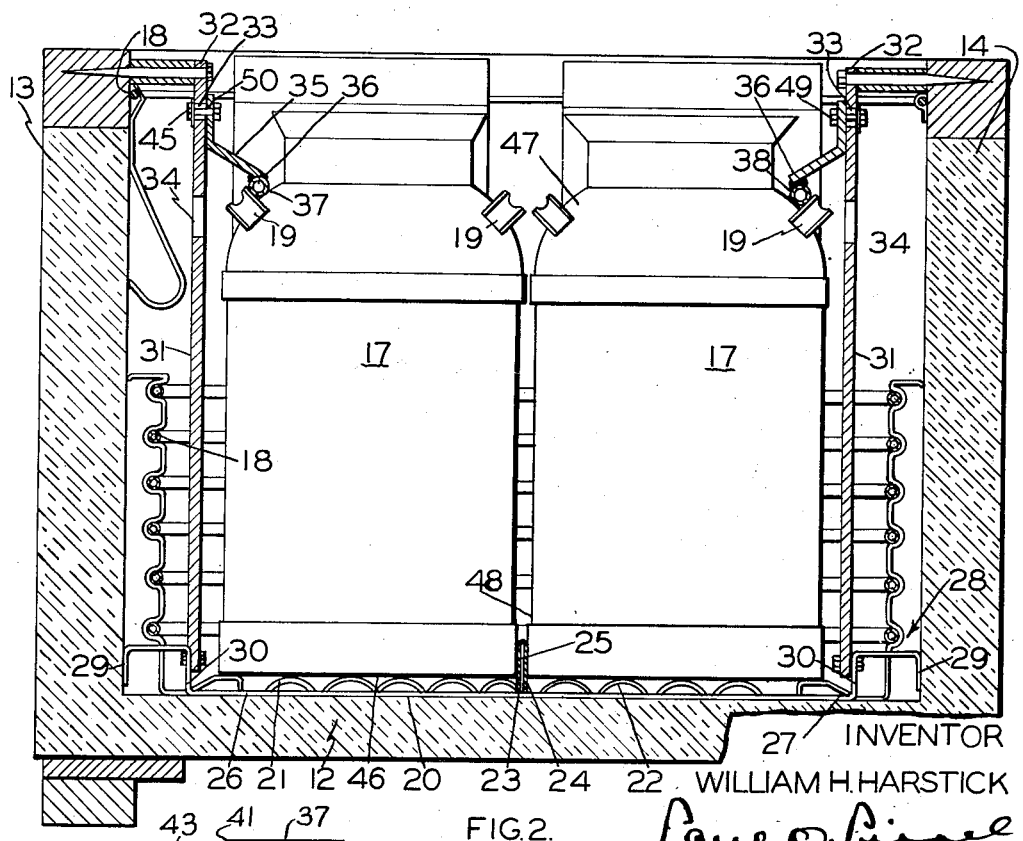
FIG. 2.
FIG. 3.
INVENTOR
WILLIAM H. HARSTICK
Paul O. Pippel
ATT'Y Patented Oct. 6, 1953

2,654,500

UNITED STATES PATENT OFFICE 2,654,500

CAN SUBMERGING DEVICE FOR MILK COOLERS

William H. Harstick, Oak Park, Ill., assignor to International Harvester Company, a corporation of New Jersey Application October 15, 1949, Serial No. 121,595

4 Claims. (Cl. 220—15)

This invention relates to a milk cooler. More particularly, the present invention is primarily concerned with a device to maintain a plurality of milk cans submerged and upright within a liquid-filled receptacle.

Heretofore, to cool milk it was customary to provide a receptacle having a suitable cooling liquid, generally water, therein, and to provide suitable apparatus for refrigerating the cooling liquid. Milk from the milking pails and at the animal's body temperature was poured into cans of the type used to ship or store bulk milk which, when full, were lifted by the farmer and placed substantially submerged within the receptacle. Inasmuch as the farmer was required to lift a full can, or substantially full can, of milk from the floor and position it within the receptacle, the milking operation required considerable physical effort on the part of the farmer. The present invention contemplates the provision of a device whereby empty milk cans may be positioned within the receptacle and filled while in that position. The device retains the cans in a substantially submerged and upright condition against the buoyant effect of the cooling liquid even though the cans may be empty.

Another object of the present invention is the provision of a holding device which is particularly useful with the equipment necessary to practice the modern "pipe line milker" system which, briefly stated, is the simultaneous milking, cooling and storing of the milk.

Still another object of the invention is the provision of a device which may be built as an integral part of the milk cooler or as an attachment which will modify present-day milk coolers so they may be used in the "pipe line milker" system.

The foregoing and other important objects and desirable features inherent in and encompassed by the invention will become more readily apparent from a reading of the following description in conjunction with the annexed drawings in which:

Fig. 1 is a plan view of a milk cooler showing the holding device positioned within the milk cooler.

Fig. 2 is a sectional view taken substantially along line 2—2 of Fig. 1, and

Figure 3 is a fragmentary enlarged side elevational view of one of the telescoping members.

Referring to the drawings in which like reference characters represent like elements throughout the various views, there is shown a milk cooler designated generally by numeral 10. The milk cooler 10 comprises a liquid-filled receptacle 11 having an insulated bottom 12, a pair of vertically extending insulated side walls 13, 14, and a pair of insulated end walls 15, 16. The receptacle 11 is designed to be filled with a liquid, generally water, for cooling the contents of a plurality of milk cans, hollow vessels or receptacles 17 positioned within the receptacle 11. The water is maintained at a predetermined temperature by circulating a heat transfer media or refrigerant through coil or heat transfer element 18. The level of the water within the receptacle 11 is maintained, as shown in Fig. 2, at a height to permit access to the interior of the cans without allowing the cooling water to enter. The milk cans 17 are of conventional type used to ship or store bulk milk and have a pair of diametrically disposed outwardly projecting handles or projections 19.

With the advent of the "pipe line milker" system wherein milk is caused to flow to the milk cooler directly from the cow it will be apparent that the milk cans within the water-filled receptacle must be maintained in a substantially submerged position although empty in order to best remove the animal heat. It is equally apparent that the milk cans must be retained in a vertical up-standing or upright position during the filling operation to prevent the cans from spilling their contents by toppling over or allowing water to seep into the milk, thus causing contamination. The invention to be described herein is particularly concerned with providing a device which can be incorporated in future milk coolers as an integral part thereof or as an attachment for existing milk coolers for effectively performing these objectives.

Positioned on the interior surface 20 of the bottom wall 12 are a pair of longitudinally extending corrugated sheet metal members 21, 22 adapted to support the milk cans 17 off the bottom wall 12 in order to allow better circulation of the cooling water on all surfaces of the cans. Spaced approximately midway between the side walls 13, 14 and abutting the inner marginal edges 23, 24 of members 21, 22 is a longitudinally extending upright member or bumper rail, abutment means or stop 25. The bumper rail 25 is supported by means of a plurality of transversely extending longitudinally spaced bars 26. Each end 27 of the bars 26 is provided with a channel-shaped spacer element 28. One leg 29 of each channel-shaped spacer element 28 is adapted to abut a side wall 13, 14 and position the bumper rail 25 within the receptacle 11. The other legs 30 of the spacer elements 28 provide attaching structure for one end of a plurality of upright members 31. Members 31 extend vertically to substantially the top marginal edge of the side walls 13, 14 and are rigidly secured at their upper ends 32 to the side walls 13, 14 as by wood screws or the like. It will be noted that members 31 are provided with a plurality of slots 33, 34, the purpose of which will be explained hereinafter.

Supported by each member 31 is a downwardly and inwardly projecting supporting bracket 35. Attached to the innermost ends 36 of the brackets 35 adjacent side wall 13 is a horizontal longitudinally extending hollow rod or abutment retainer means 37. A similar rod or abutment retainer 38 is secured to the innermost ends 36 of the brackets 35 adjacent the side wall 14. It will be noted that the rods 37, 38 are parallel and have one of their ends 39, 40 extending to substantially adjacent the end wall 16. The rods 37 and 38 define a receiving region with the bottom of the container. The opposite ends 41, 42 of the rods 37, 38 terminate, as shown in Fig. 1, a longitudinal distance from the end wall 15. It will be appreciated that the ends 41, 42 are spaced a sufficient distance from the end wall 15 to provide an access area to allow the insertion or removal of the milk cans to or from the interior of the receptacle 11. Slidably mounted within the rods 37, 38 are rod members 43, 44 adapted to extend or telescope from ends 41, 42 to a position substantially adjacent the end wall 15 and thus close the access area.

In operation, supporting brackets 35 are fastened to members 31 by inserting bolts 49 in apertures 50 formed in each bracket. The bolts 49 are then inserted in slots 33 or 34 depending upon whether it is desired to maintain either eight or ten gallon milk cans submerged. Since the slots 33 or 34 are slightly elongated, slight variations of height in the milk cans of different manufacturers may be accommodated. Nuts 45 are tightened to rigidly position the rods 37, 38 within the receptacle 11. Empty milk cans 17 are manually submerged, one at a time, in the access area, it being understood that rod members 43, 44 are completely telescoped. When a can 17 is depressed to the bottom of the milk cooler 10 and the bottom surface 46 of the can 17 abuts the corrugated sheet metal members 21, 22 it is rotated about its vertical axis until the V formed between one of the handles 19 and the body 47 of the can just passes beneath one of the rods 37, 38. In this position a lower inwardly facing surface 48 of the can abuts the bumper rail 25. The can 17 is then moved horizontally toward the end wall 17 in an upright condition. It will be apparent that the can is maintained in a vertical upright submerged position by the rods 37, 38 and the bumper rail 25. The two cans 17 adjacent the end wall 15 are depressed within the receptacle 11 as are the other cans. When in the depressed position rod members 43, 44 are extended from ends 41, 42 through the apex of the V formed by the handle 19 and the body 47 of the can to a position substantially adjacent the end wall 15 shown in the dotted line construction of Fig. 1.

It will be seen that the rods 37 and 38 are disposed along the remote sides of the two rows of cans outwardly of the centers of buoyancy of the cans of the respective rows and thus the tendency is for the cans to swing with their lower ends toward the center of the container away from the coil 18 disposed along the sides of the container. This feature positively precludes injuring the coil 18 by the cans hammering thereagainst as they are moved from the entry way to the opposite end of the container. It will be seen that the engagement of the cans along the bottom edges on generally vertical surfaces at sides thereof remote from the adjacent sections of the coil with the bumper precludes the cans from turning or swinging toward the coils on the bumper.

The embodiment of the invention chosen for the purpose of illustration and description herein is that preferred as a result of selective tests based upon the requirements for achieving the objects of the invention and developing the utility thereof in the most desirable manner, due regard being had to existing factors of economy, simplicity of design and construction, the improvements sought to be effected and the feasibility of converting existing milk coolers into those which may be utilized in a "pipe line milker" system. It will be appreciated, therefore, that the particular structural and functional aspects emphasized herein are not intended to exclude, but rather to suggest, other adaptations and modifications of the invention as fall within the spirit and scope of the invention as defined in the appended claims.

What is claimed is:

1. A milk cooler comprising a liquid-filled receptacle having a bottom, end walls, and side walls to receive a plurality of upright longitudinally spaced milk cans, said milk cans being of the type having an outwardly projecting handle; and means for retaining said cans in a substantially submerged and upright condition against the buoyant effect of the liquid when the cans are empty, said means comprising a longitudinally extending bumper rail positioned on said bottom between and substantially parallel to said side walls; means to support said bumper rail including a plurality of transversely extending, longitudinally spaced bars, said bars having spacer elements at each end adapted to abut said side walls; a plurality of upright members having their lower ends connected to said spacer elements; means connecting the upper ends of said upright members to said side walls; supporting brackets connected to said upright members projecting downwardly and inwardly into the receptacle; a plurality of longitudinally extending rods connected to said brackets and disposed within the upper part of the receptacle, said rods being substantially parallel and having one of their ends terminating closely adjacent to an end wall of said receptacle, the other ends of said rods being longitudinally spaced from the opposite end wall a distance sufficient to provide an access area to allow the insertion or removal of said milk cans between said other ends of the rods and said opposite end wall to or from said receptacle beneath said rods, said milk cans being positionable within said receptacle in substantially parallel longitudinal lines with a lower portion of each can in abutment at one side with said bumper rail and the handle thereof extending from the opposite side beneath and in abutment with the adjacent rod and means to close said access area and maintain the milk cans contiguous to said area submerged within said receptacle comprising a member adapted to extend from each of said rods over and in abutment with a handle of an adjacent can closely adjacent to said opposite end wall.

2. A milk cooler comprising a liquid-filled receptacle having a bottom, end walls, and side walls to receive a plurality of upright longitudinally spaced milk cans, said milk cans being of a type having outwardly projecting handle means; and means for retaining said cans in a substantially submerged and upright condition against the buoyant effect of the liquid when the cans are empty, said last-mentioned means comprising a longitudinally extending, vertical plate positioned on said bottom between said side walls; means to support said vertical plate; a plurality of longitudinally extending substantially parallel rods spaced above the bottom and extending between said end walls along the respective side walls and having one of their ends terminating substantially adjacent an end wall of said receptacle, the other ends of said rods being longitudinally spaced from the opposite end wall to provide an access area to allow the insertion or removal of said milk cans from said receptacle; means to support said rods above said milk cans, said milk cans being positionable within said receptacle at opposite sides of said plate with a lower portion of each can abutting said vertical plate and the handle means of each can disposed beneath the adjacent rod; and means to close said access area and maintain the milk cans contiguous to said area submerged within said receptacle comprising a member adapted to extend from each of said rods to a position substantially adjacent to said opposite end wall and over and in abutment with the handle means of the adjacent of the last-mentioned cans.

3. In a cooler comprising a liquid filled receptacle having a bottom, end and side walls, means to maintain a plurality of cans substantially submerged and in an upright position within said receptacle comprising a bumper on said bottom wall, a plurality of transverse bars on said wall supporting the bumper between said side walls, a plurality of upright members secured to a side wall and to said bars, a hollow rod spaced from the bottom wall and extending lengthwise between said end walls and having one end closely adjacent an end wall and the other end spaced from the opposite end wall a distance at least sufficient to permit passage of a can into and out of the receptacle between said other end of said rod and said opposite end wall, a plurality of inwardly projecting brackets having one end attached to said hollow rod, means for adjustably supporting said brackets on said upright members, said cans being positionable in said receptacle against said bumper at one side and at the opposite side projecting at least partially beneath said rod for holding down engagement thereby when said cans are empty, a second rod slidably mounted in the hollow rod and extensible from the other end thereof toward said opposite end wall and adapted to engage a portion of at least one can positioned at least partially at one side beneath the second rod and engaging said bumper at its opposite side.

4. A milk cooler comprising a liquid-filled container adapted to receive two side by side rows of milk cans of a type having diametrically disposed outwardly extending handles proximate to their upper extremities, abutment means in the container at the bottom thereof between and generally parallel to said rows and in abutment on opposite sides thereof with adjacent sides of the cans in respective rows a stationary member on the container along the upper part thereof disposed outwardly of each row and at the remote sides of the cans generally parallel thereto and arranged in position to extend over the handles on the outer sides of the cans there adjacent to hold the cans submerged when buoyant, the space between said rows except at the bottom of the container being open to accommodate unobstructed admittance of an operator's hand with respect to the handles on the adjacent sides of the cans in said two rows for convenience in manipulation, each can being engaged solely by said abutment means at one side along the bottom thereof and against the top side of the handle at the opposite upper side by the related member whereby when empty, the cans of respective rows tend to rotate about respective members toward each other against related sides of said abutment means in substantially counter-balancing relationship with each other.

WILLIAM H. HARSTICK.

References Cited in the file of this patent
UNITED STATES PATENTS

| Number | Name | Date |
|---|---|---|
| 114,450 | Lawrence | May 2, 1871 |
| 290,519 | Blandenburg | Dec. 18, 1883 |
| 392,391 | Wilke | Nov. 6, 1888 |
| 516,705 | Harding | Mar. 20, 1894 |
| 690,532 | Snigo | Jan. 7, 1902 |
| 884,689 | Tillotson | Apr. 14, 1908 |
| 1,569,793 | Tomhave | Jan. 12, 1926 |
| 1,688,815 | Kobash | Oct. 23, 1928 |
| 2,318,414 | Palmer | May 4, 1943 |
| 2,340,723 | Williams et al. | Feb. 1, 1944 |